(12) United States Patent
De Keyzer et al.

(10) Patent No.: US 10,343,347 B2
(45) Date of Patent: Jul. 9, 2019

(54) TANK WITH INTERNAL CONNECTING MEMBER AND METHOD FOR ASSEMBLING SUCH A TANK

(71) Applicant: Plastic Omnium Advanced Innovation and Research, Brussels (BE)

(72) Inventors: Pierre De Keyzer, Brussels (BE); Laurent Duez, Uccle (BE); Jules-Joseph Van Schaftingen, Wavre (BE)

(73) Assignee: PLASTIC OMNIUM ADVANCED INNOVATION AND RESEARCH, Brussels (BE)

( * ) Notice: Subject to any disclaimer, the term of this patent is extended or adjusted under 35 U.S.C. 154(b) by 153 days.

(21) Appl. No.: 14/912,708

(22) PCT Filed: Sep. 5, 2014

(86) PCT No.: PCT/EP2014/068996
§ 371 (c)(1),
(2) Date: Feb. 18, 2016

(87) PCT Pub. No.: WO2015/032924
PCT Pub. Date: Mar. 12, 2015

(65) Prior Publication Data
US 2016/0200189 A1    Jul. 14, 2016

(30) Foreign Application Priority Data

Sep. 6, 2013 (EP) .................... 13183419

(51) Int. Cl.
*B29C 65/00* (2006.01)
*B60K 15/03* (2006.01)

(52) U.S. Cl.
CPC ........ *B29C 66/54* (2013.01); *B60K 15/03177* (2013.01); *B60K 2015/03032* (2013.01);
(Continued)

(58) Field of Classification Search
CPC .... B60K 15/03177; B60K 2015/03032; B60K 2015/0346; B29C 65/242; B29C 66/54; B29C 65/18; B29C 65/20
(Continued)

(56) References Cited

U.S. PATENT DOCUMENTS 2,360,950 A * 10/1944 Kilgour ................. B29C 65/20
156/158
5,129,544 A    7/1992 Jacobson et al.
(Continued)

FOREIGN PATENT DOCUMENTS

CA    2 654 106 A1    1/2008
CN    1225057 A    8/1999
(Continued)

OTHER PUBLICATIONS

Translation of DE102011015049A1.*
(Continued)

*Primary Examiner* — John L Goff, II
(74) *Attorney, Agent, or Firm* — Oblon, McClelland, Maier & Neustadt, L.L.P.

(57) ABSTRACT

A method for assembling a tank, including: providing a plastic first shell, a plastic second shell with an opening, and at least one connecting member with a plastic end part configured to be arranged in or around the opening, the first and second shell delimiting an internal volume of the tank, and the connecting member being dimensioned for connecting the first and second shell in the internal volume of the tank; welding a circumference of the first shell to a circumference of the second shell; arranging the end part in or around the opening; and connecting the end part of the connecting member to a wall part of the second shell by (Continued)

heating an external area of the second shell surrounding the opening and/or by heating the end part of the connecting member.

9 Claims, 7 Drawing Sheets

(52) U.S. Cl.
CPC ............... *B60K 2015/0346* (2013.01); *B60K 2015/03493* (2013.01)

(58) Field of Classification Search
USPC ...... 156/293, 294, 308.2, 308.4, 309.6, 158, 156/221, 499; 220/562, 564
See application file for complete search history.

(56) References Cited

U.S. PATENT DOCUMENTS

| | | | |
|---|---|---|---|
| 6,135,306 A * | 10/2000 | Clayton | B60K 15/03177 220/501 |
| 6,857,534 B1 | 2/2005 | Keller | |
| 2005/0127078 A1 * | 6/2005 | Vorenkamp | B29C 66/61 220/562 |
| 2012/0138606 A1 | 6/2012 | Varga | |
| 2012/0325822 A1 | 12/2012 | Pozgainer | |
| 2014/0014663 A1 | 1/2014 | Eulitz et al. | |

FOREIGN PATENT DOCUMENTS

| | | | | |
|---|---|---|---|---|
| CN | 101489759 A | | 7/2009 | |
| CN | 102837597 A | | 12/2012 | |
| DE | 3131040 A1 | * | 3/1983 | ....... B60K 15/03006 |
| DE | 199 09 041 A1 | | 9/2000 | |
| DE | 10 2009 036 911 A1 | | 2/2011 | |
| DE | 10 2011 015 049 A1 | | 9/2012 | |
| JP | 61-89824 A | | 5/1986 | |
| WO | WO-2012126569 A2 | * | 9/2012 | ............ B29C 49/20 |
| WO | WO 2012/139962 A1 | | 10/2012 | |

OTHER PUBLICATIONS

Machine translation of DE 3131040 date unknown.*
Machine translation of DE 19909041 date unknown.*
Merriam-Webster definition of "outwardly" Dec. 2017.*
International Search Report dated Nov. 26, 2014, in PCT/EP2014/068996 Filed Sep. 5, 2014.

* cited by examiner

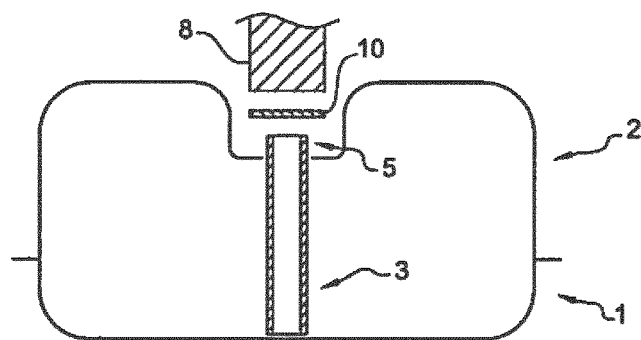
Fig. 3A
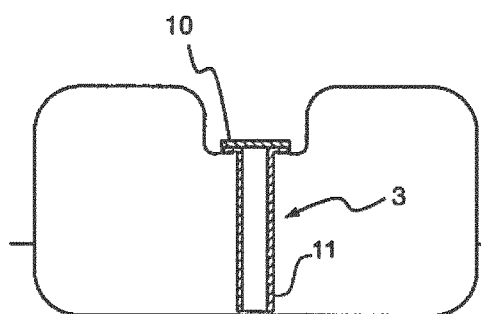 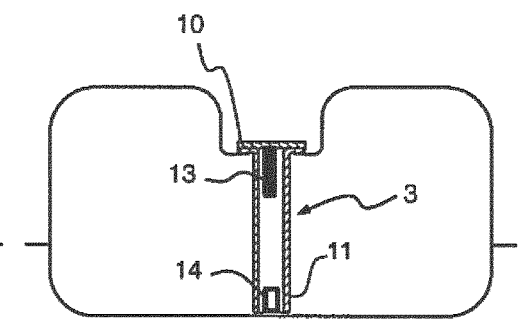
Fig. 3B              Fig. 3C
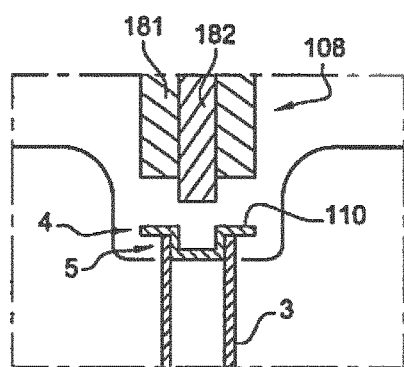
Fig. 4

TANK WITH INTERNAL CONNECTING MEMBER AND METHOD FOR ASSEMBLING SUCH A TANK

FIELD OF INVENTION

The invention relates to a tank, typically a fuel tank or an additive tank for a vehicle, comprising at least a first plastic shell and a second plastic shell. The second shell is welded along a circumference thereof to a circumference of said first shell. Also, the invention relates to a method for assembling a tank from a first shell and a second shell.

BACKGROUND

Fuel tanks assembled from a two plastic shells are known, and may comprise a stabilizing column or wall in the internal volume of the tank in order to limit deformations of the tank. Traditionally fuel systems in passenger vehicles are designed to hold a specific amount of liquid fuel at a pressure essentially the same as the ambient pressure. With the introduction of Hybrid vehicles and more specifically Plug in Hybrids, which are designed such that they could potentially go several months without using fuel, it is in the interest of the system designers to hold pressure inside the fuel tank to limit the emissions that could potentially bleed through the activated carbon canister due to diurnal cycles. In addition, holding pressure ensures that the composition of the fuel stays the same during storage. However, the tanks must be made resistant to this internal pressure. Therefore tank reinforcement can be realized by linking two opposite tank surfaces with each other using an internal pillar.

It is known to form a stabilizing pillar or wall using a first pillar or wall part that is integrally moulded with the first plastic shell and a second pillar or wall part that is integrally moulded with the second plastic shell. When welding the first shell along its perimeter to the second shell, at the same time, the first pillar or wall part may be connected (e.g. by welding or by a snap connection, see DE 102009036911) to the second pillar or wall part in order to form the stabilizing pillar or wall in the internal volume of the tank. In the case of welding this is a complex and delicate operation as the first and second pillar or wall parts are not easily accessible. The reinforcement pillars or walls are typically at a distance from the perimeter welding path of the first and second shells, resulting in the need for complex welding tools. Also, a very delicate controlling of the welding operation is required as the dimensional tolerance on the moulded first and second shells may lead to interference between the first and second shell at a number of locations and lack of contact at a number of other locations.

SUMMARY

The object of embodiments of the invention is to provide a method for assembling a tank which is more robust and requires a less complicated assembly operation compared to the prior art solutions. Another object of the invention is to provide a tank that may be assembled using a reliable and simple assembly method. Yet another object of embodiments of the invention is to provide a method allowing for a simple and fast controlling of the welding operation of a connecting member, such as a reinforcement pillar, that needs to be provided in an internal volume of a tank.

To that end embodiments of the invention provide a method for assembling a tank. The method comprises providing a plastic first shell, a plastic second shell with an opening, and a connecting member with a plastic end part suitable for being arranged in or around the opening, wherein the first and second shell delimit an internal volume of the tank. The connecting member is dimensioned for connecting the first shell to the second shell in the internal volume of the tank. A circumference of the first shell is welded to a circumference of the second shell. The end part of the connecting member is arranged in the opening and is connected to a wall part of the second shell by heating an external area of the second shell surrounding the opening and/or by heating the end part of the connecting member. It is noted that arranging the end part in the opening may be performed before or after the welding of the first shell to the second shell. Optionally, the connecting by heating and the welding of the first shell to the second shell may be performed simultaneously. In a particular embodiment, the connecting member can be connected in a leak-tight way to the wall part of the second shell.

Such embodiments have the advantage that the area where heat needs to be applied is accessible from the exterior of the tank and that the connecting step can be well controlled, ensuring that the connecting member is well fixed to the second shell and improving the reliability of the assembly. Also, the test methods to control the reliability of the connection after the assembly can be simpler than prior art test methods, and the heat may be applied using a simple tool, since the area to be connected is not located in an inaccessible part of the internal volume of the tank.

Preferably the connecting is performed by applying pressure on the external area surrounding the opening and/or on the end part. In an exemplary embodiment the connecting is performed by pressing a heated tool on the external area surrounding the opening and/or on the end part. According to other techniques the heating may be performed by applying vibrations, or by any other suitable welding technique allowing the end part to be connected to the second shell.

Preferably the first shell and the connecting member are moulded as a single piece. In that way no further steps are required to connect the connecting member to the first shell. However, according to other embodiments the connecting member may be a separately moulded part that is connected to an internal wall of the first shell before the welding and the connecting step. According to yet another embodiment the first shell is also provided with an opening, and the connecting member is arranged in the internal volume with a first end part thereof in the opening in the first shell, and with a second end part thereof in the opening in the second shell. The method may then further comprises the step of connecting the first end part to a wall part of the first shell by heating an external area of the first shell and/or the first end part surrounding the opening in the first shell.

The connecting member may be made entirely from one or more plastic materials, but could also be contain reinforcement materials such as metal elements. The connecting member may be e.g. an over-moulded metal part.

In a preferred embodiment the second shell is moulded with a wall with a recessed part with a bottom containing the opening (the opening may be moulded or provided after moulding), wherein the bottom comprises a circumferential zone around the opening; and the end part is adhered to the circumferential zone. In such an embodiment the recessed part forms a prolongation of the connecting member, allowing the height of the connecting member to be smaller. In that way the first shell may be moulded with an integral connecting member in an easier manner. Further, the recessed part may be used for mounting additional components, such as a PCB with electronic components.

In a possible embodiment the end part comprises a tubular part, and the connecting comprises heating the tubular part such that it adheres to a circumferential wall part surrounding the opening. In an exemplary embodiment the connecting comprises pressing the tubular part outwardly. In that way a connection along a circumferential surface, e.g. an annular surface, is formed guaranteeing a leak-tight connection.

In another embodiment the end part comprises a solid part, and the connecting comprises pushing said solid part outwardly onto a circumferential wall part surrounding the opening, whilst heating said solid part, such that said outwardly pushed part is adhered to the circumferential wall part.

Usually hollow connecting members are preferred, but if the connecting member needs to have a small diameter, solid parts may be preferred. Depending on the required reinforcement of the tank and/or on the required function of the connecting member(s) there may be used a number of hollow and/or solid connecting members.

In a possible embodiment the second shell is provided with an edge surrounding the opening therein, and the connecting comprises pressing said edge against the end part, such that it adheres thereto. The edge may be an edge extending outwardly, away from the internal volume of the tank, or an edge extending inwardly, into the internal volume of the tank. In the former case, the end part may be provided in the opening and the edge may be pressed inwardly against the end part, while in the latter case a tubular end part may be provided around the opening and the edge may be pressed against the inner surface of the tubular end part.

In a further developed embodiment a cover is arranged over and connected along a circumference thereof, in a leak-tight way, to the end part and/or to a wall part of the second shell. In that way, in case of a hollow connecting member an open upper end thereof may be closed off in a leak-tight way. This will allow using the interior of the hollow connecting member for storing liquid, and to that end there may be provided holes in a lower part of the connecting member.

In a possible embodiment a tank accessory is arranged in or on the connecting member. If the connecting member is hollow and the interior thereof is communicating with the internal volume of the tank, the accessory could be e.g. any one of the following: a level gauge, a pressure sensor, a filter, a pump, a temperature sensor, etc. In other embodiments the connecting member is hollow but the interior thereof is not communicating with the internal volume of the tank, in which case the accessory could be e.g. a PCB with electronic components.

In an embodiment the tool is adapted to give the end part a snapped rivet geometry. In an exemplary embodiment for use with a tubular connecting member the tool may have a central alignment part (not heated) surrounded by an annular heating part, such that the central alignment part may be inserted in the tubular connecting member whilst the heated annular part is pressed against the end part.

Preferably the first shell and/or the second shell are moulded by any one of the following techniques, or a combination thereof: injection moulding, compression moulding, injection-compression moulding, thermoforming, blow moulding, extrusion blow moulding, co-injection moulding, over-moulding by injection.

According to another aspect of the invention there is provided a tank comprising a first plastic shell and a second plastic shell. The second shell is welded along a circumference thereof to a circumference of the first shell. The first and second shells delimit an internal volume of the tank. The connecting member extends in the internal volume of the tank and connects the first shell to the second shell. The second shell is provided with an opening, and an end part of the connecting member is connected in a leak-tight way to a circumferential wall part of the second shell surrounding the opening. By providing the opening in the second shell the connection can be realised in a simple manner, in an area which is visible from the outside of the tank. It is noted that the opening may be closed off by a cover, but also in such embodiments the covered opening will still be distinguishable in the second shell of the assembled tank.

Preferably, the end part has a substantially annular part adhered to the circumferential wall part surrounding the opening. The end part may be a deformed tubular part, preferably having an outwardly flared part adhered to the circumferential wall part. According to a variant the end part is a deformed (compressed) solid end part having dimensions that are larger than the dimensions of the opening. In that way a connection along a circumferential surface, e.g. an annular surface, is formed guaranteeing a leak-tight connection.

In a possible embodiment the connecting member is a hollow elongate part. However, in other embodiments the connecting member may be a solid part. Usually hollow connecting members are preferred, but if the connecting member needs to have a small diameter, solid parts may be preferred. Depending on the required reinforcement of the tank there may be used a number of hollow and/or solid connecting members.

In a preferred embodiment the second shell has a wall with a recessed part with a bottom containing the opening. The bottom comprises a circumferential zone around said opening and the circumferential zone is adhered to the end part. In such an embodiment the recessed part forms a prolongation of the connecting member, allowing the height of the connecting member to be smaller. In that way the moulding of the first shell may be easier. Further, the recessed part may be used for mounting additional components, such as a PCB with electronic components.

In a possible embodiment a cover is arranged over and connected in a leak-tight way to the end part and/or a circumferential wall part surrounding the opening. In that way, in case of a hollow connecting member an open upper end thereof may be closed off in a leak-tight way. This will allow using the interior of the hollow connecting member for storing liquid, and to that end there may be provided holes in a lower part of the connecting member.

In a preferred embodiment the first shell is a bottom shell of the tank and the second shell is a top shell of the tank.

In a possible embodiment the second shell is provided with a circumferential edge surrounding the opening therein, and the edge is adhered to the end part. The edge may be an edge extending outwardly, away from the internal volume of the tank, or an edge extending inwardly, into the internal volume of the tank. In the former case, the end part may be connected to an inner surface of the edge, while in the latter case a tubular end part may be provided around the edge, wherein an inner surface of the tubular end part is adhered to the edge.

According to yet another aspect, the invention relates to a tank assembled according to any one of the above disclosed assembly methods.

Embodiments of the invention are particularly useful for gasoline fuel tanks because of the high pressure that may reign in such tanks. However, embodiments of the invention may also be used in other fuel tanks, in additive tanks, in particular tanks for diesel additives, such as urea tanks, etc. Also in applications where depressurization may occur, tanks according to embodiments of the invention will be useful.

The term "fuel tank" is understood to mean an impermeable tank that can store fuel under diverse and varied environmental and usage conditions. The fuel tank according to the invention is preferably made of plastic, that is to say made of a material comprising at least one synthetic resin polymer. In a preferred embodiment the shells are made of polyamide, e.g. polyamide-6. However, all types of plastic may be suitable. Particularly suitable are plastics that belong to the category of thermoplastics. The term "thermoplastic" is understood to mean any thermoplastic polymer, including thermoplastic elastomers, and blends thereof. The term "polymer" is understood to mean both homopolymers and copolymers (especially binary or ternary copolymers). Examples of such copolymers are: random copolymers, linear block copolymers, other block copolymers and graft copolymers. One polymer often employed is polyamide. However, excellent results may also be obtained with high-density polyethylene (HDPE). Preferably, the tank also comprises a layer of a fuel-impermeable resin such as, for example, EVOH (a partially hydrolysed ethylene/vinyl acetate copolymer). Alternatively, the tank may be subjected to a surface treatment (fluorination or sulphonation) for the purpose of making it impermeable to fuel. A multilayer fuel tank comprising an EVOH layer between two HDPE layers is successfully used in the frame of the invention.

In preferred embodiments the connecting member connects two opposite wall portions of the tank, i.e. wall portions facing each other, namely a first wall portion being part of the first shell and a second wall portion being part of the second shell. Preferably, these are a lower wall portion (the one mounted facing downwards in the vehicle and which is likely to creep under the weight of the fuel) and an upper wall portion (the one mounted facing upwards and subject to little or no creep during use).

This connecting member is by definition rigid, i.e. over the life of the tank, it does not deform by more than a few mm, ideally it deforms by less than 1 mm. By "deformation" in meant in fact, a change of the length thereof in the sense that it would space away or approach the two tank shells.

Although certain features have been described only in connection with embodiments of the method, the skilled person understands that corresponding features may be present in the tank, and vice versa.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which:

FIGS. 3A-3C illustrate schematically a second embodiment of the method of the invention, as well as the resulting tank;

FIG. 4 illustrates schematically a further embodiment of the method of the invention;

FIGS. 6A-6C illustrate schematically a fourth embodiment of the method of the invention, wherein FIGS. 6B and 6C are detailed views of the connecting step representing the situation before and after the application of heat and pressure;

FIGS. 8A-8B illustrate schematically a sixth embodiment of the method of the invention, wherein FIG. 8B is a detailed view of the connecting step representing the connected parts after the application of heat and pressure.

DESCRIPTION OF EMBODIMENTS

Figure 1A:
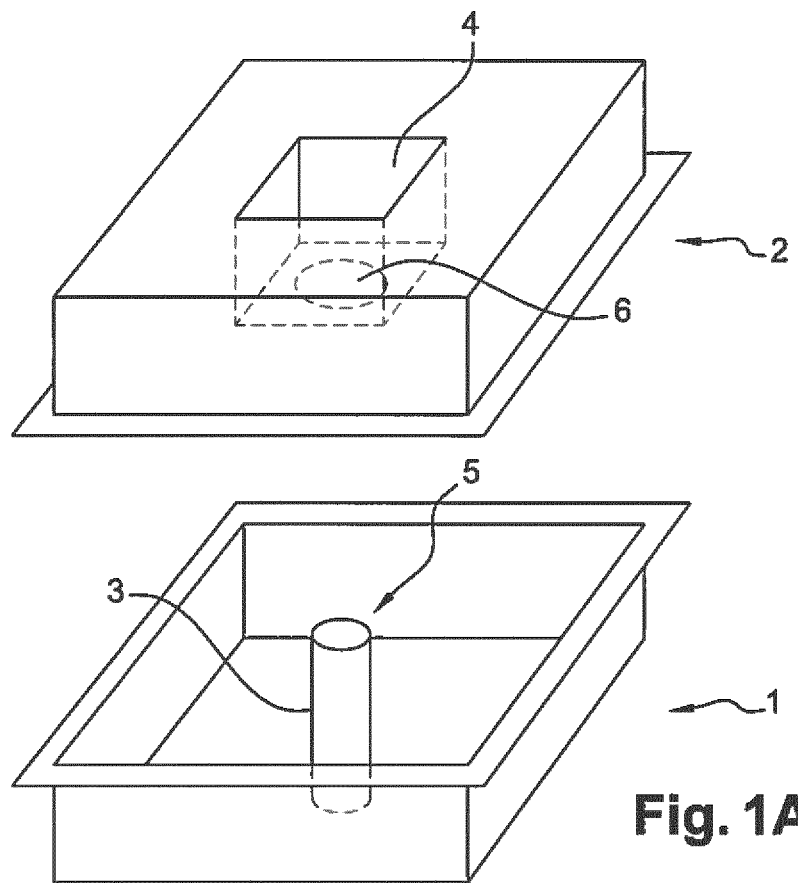
FIGS. 1A and 1B illustrate a schematic perspective view of a first embodiment of a tank of the invention before and after assembly, respectively.
Figure 1B:
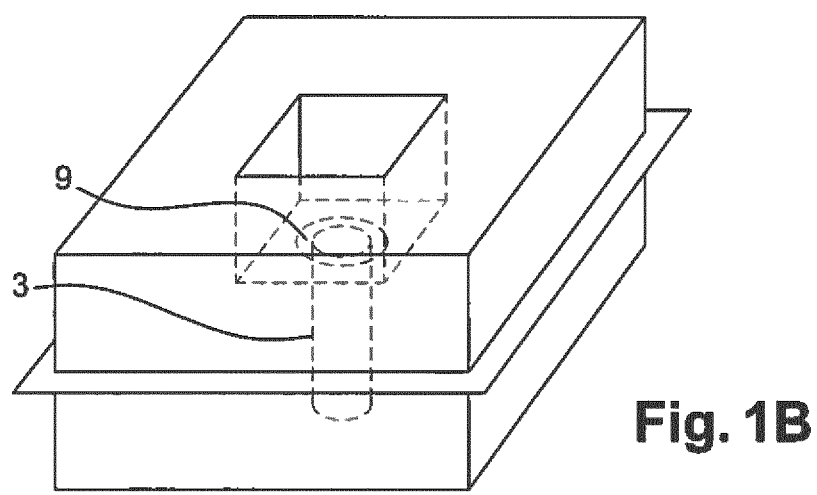

FIGS. 1A-1B and 2A-2C illustrate schematically a first embodiment of a tank and method of the invention. The tank is assembled from a top shell 2 and a bottom shell 1. A connecting member functioning as a reinforcement member 3 is integrated in a bottom wall portion of the bottom shell and a recessed part 4 is integrated in a top wall portion of the top shell 2. The reinforcement member 3 is integrally moulded with the bottom shell 1. The reinforcement member 3 has an end part 5, and the recessed part 4 has a bottom with an opening 6 dimensioned for receiving the end part 5. In the assembled position of the shells 1, 2, the end part 5 extends through the opening 6, see FIG. 2B. In the illustrated embodiment the reinforcement member is an elongate hollow part, and the end part is tubular. Although the tubular end part 5, before deformation, see further, is shown to be cylindrical with a constant circular cross section, the skilled person understands that the end part 5 could also have a variable cross section which does not need to be circular. E.g. the end part could have a hollow prismatic shape, wherein the opening would than preferably have a similar shape. Further, the reinforcement is shown in the form of a hollow cylindrical pillar with a constant cross section, but the skilled person understands that the cross section may be variable, see also e.g. WO 2012/139962 in the name of the Applicant.

Top shell 2 and bottom shell 1 are welded together along a tank perimeter 7. After the welding, the end part 5 is molten by a heated tool 8 to form a rivet snapping geometry 9, see FIGS. 1B, 2B and 2C. In other words the deformed end part 5 is adhered to an annular surface of the exterior wall of the upper shell 2 surrounding the opening 6, in order to obtain a leak-tight connection.

By providing the recessed part 4, the height of the reinforcement member 3 may be smaller, resulting in an easier moulding of the bottom shell 1. Indeed, the recessed part 4 forms a prolongation of the reinforcement member 3. Further, the recessed part 4 may be used for mounting additional components, such as a PCB with electronic components.

In order to improve the shock resistance of the assembled tank, the first shell may be provided with an annular recess 12 at a bottom part of the connecting member 3 where the connecting member 3 adjoins the first shell 1. Although not shown, the skilled person understands that the second shell 2 could be provided with a similar annular recess around the opening 6.

FIGS. 3A-3B illustrate a second embodiment of a method of the invention. The method is similar to the method of FIGS. 2A-2C with this difference that a cover 10 is arranged over the end part 5, whereupon the tool 8 is pushed against the cover 10 in order to deform the end part 5, and adhere the end part 5 to the exterior wall of the top shell 2, and the cover 10 to the end part 5. In that way the open upper end of the hollow reinforcement member 3 is closed in a leak-tight way. This will allow using the interior of the hollow reinforcement member 3 for storing liquid, and to that end there may be provided holes 11 in a lower part of the reinforcement member 3.

Advantageously, cover 10 can act as a support for one or several component(s). In a first particular embodiment, the component(s) can be integrated (i.e. located) within the cover. For example, the cover can be made of thermoplastic material, and the component(s) can be overmoulded with the cover. In a second particular embodiment, the component(s) can be attached (i.e. fixed) to the cover. For example, the component(s) can be welded, clipped or attached by means of a dovetail mechanism.

For example, FIG. 3C illustrates a variant of the above second embodiment, in which cover 10 comprises a component. Such component can be any mechanical or electrical device, for instance a valve, an electrical and/or hydraulic connection, an electrical component, a printed circuit, a ventilation line or component. The component may also be connected to another device or system. For example, the cover can comprise a valve which can further be connected to a venting line. In another example, the cover can comprise a sensor (temperature, pressure, quality, . . . ) which can further be connected to a control unit via appropriate electrical line(s). Cover 10 may be provided with a plurality of such components. In FIG. 3C, cover 10 comprises a valve 13 which extends out of cover 10 into the space within connecting member 3. Into that space is also located a pump 14.

FIG. 4 illustrates a further embodiment of a method of the invention. The method is similar to the method of FIGS. 2A-2C with this difference that the tool 108 is formed with a central cold alignment part 182 which is shaped to be placed in the interior of the reinforcement member 3, and with an annular heating part 181 surrounding the central alignment part 182. Optionally a specially shaped cover 110 may be arranged over the end part 5. Such an embodiment will allow for an easier positioning of the tool 108 during welding, and will ensure that heat is only applied where needed.

Figure 5A:
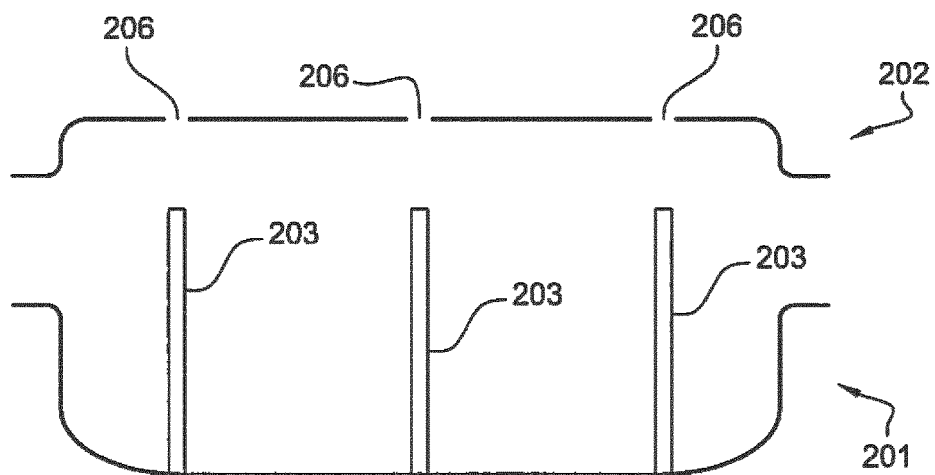
FIGS. 5A-5C illustrate schematically a third embodiment of the method of the invention, as well as the resulting tank.
Figure 5B:
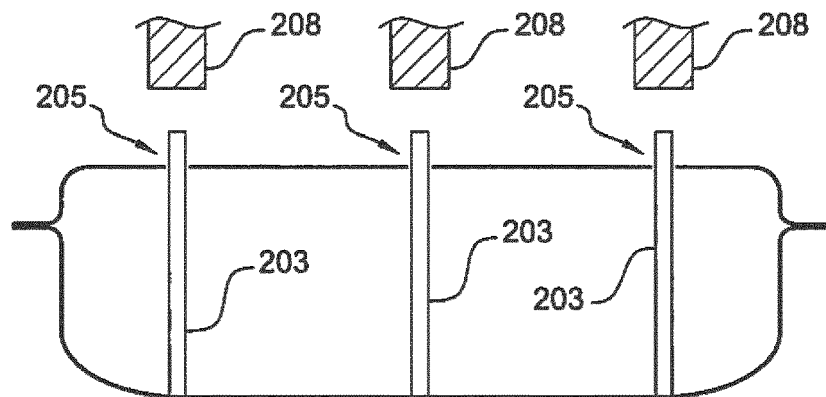
Figure 5C:
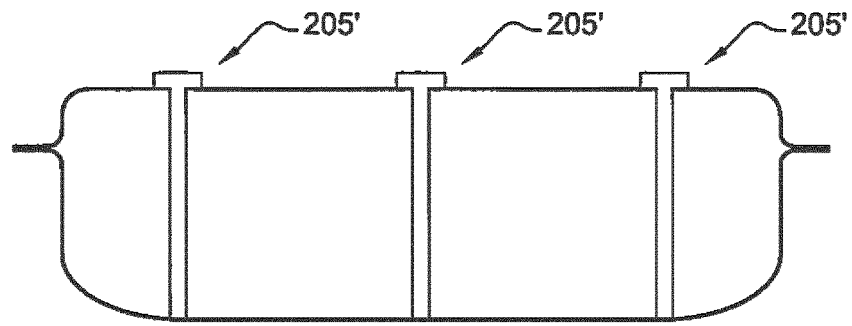

FIGS. 5A-5C illustrate a further embodiment of a method of the invention. The method is similar to the method of FIGS. 2A-2C with this difference that the bottom shell 201 is moulded with three solid reinforcement members 203, and that the top shell 202 is provided with three openings 206. In this embodiment solid end parts 205 are compressed by heated tools 208 in order to increase the dimensions of the end parts 205, when looking in a plane parallel to the exterior surface surrounding the openings 206. The flattened end parts 205' are adhered to the exterior surface of the top shell 202 in a leak-tight way through the heat applied by the tools 208. It is noted that the solid reinforcement members 203 could be pillars but could also be wall parts.

Figure 2A:
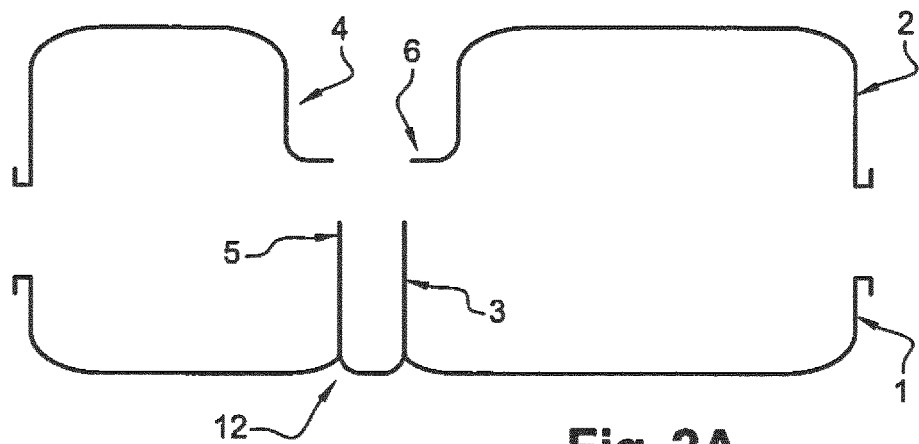
FIGS. 2A-2C illustrate schematically a first embodiment of the method of the invention, as well as the resulting tank.
Figure 2B:
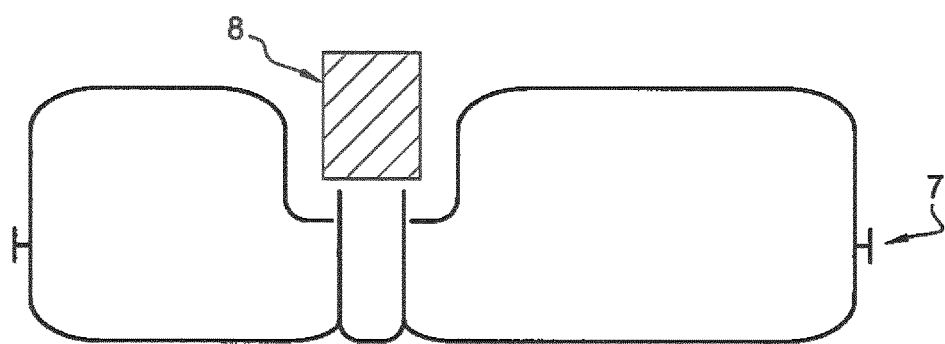
Figure 2C:
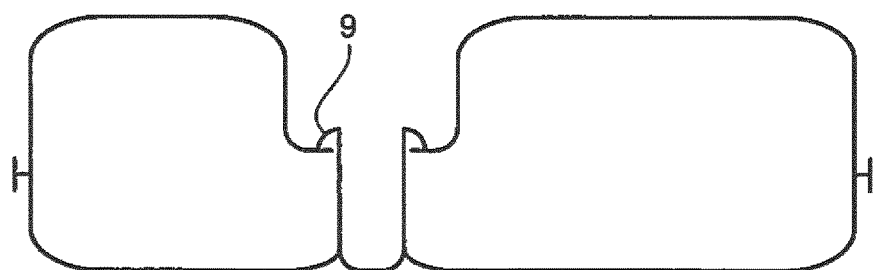
Figure 6A:
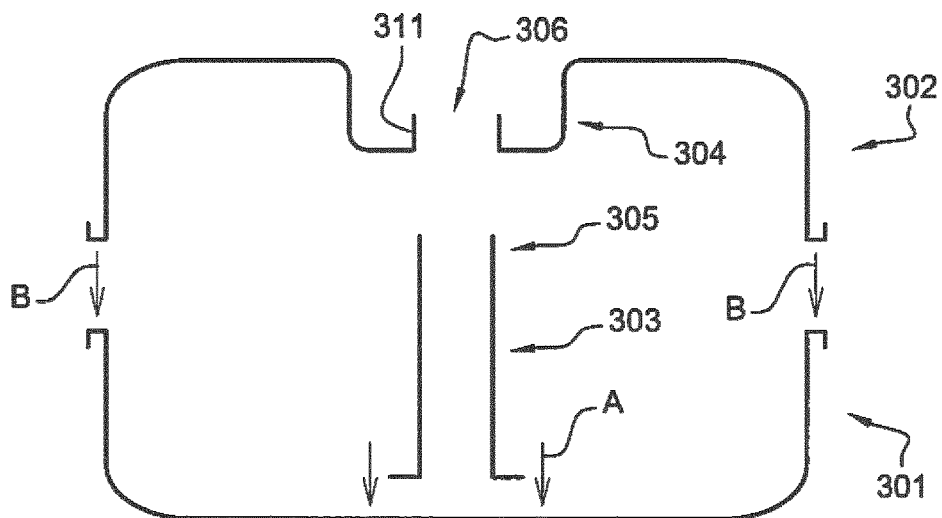
Figure 6B:
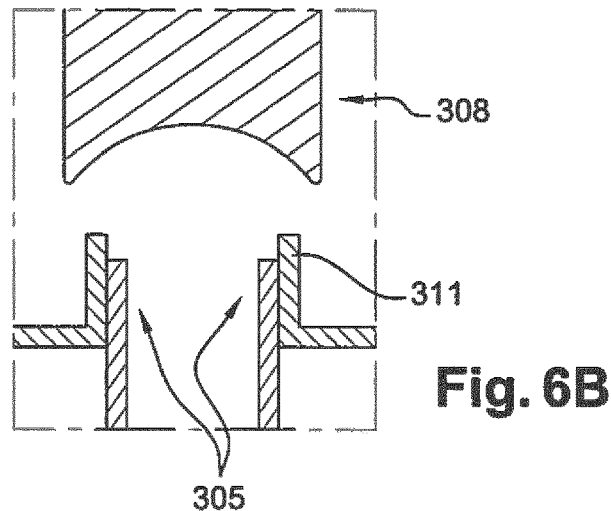
Figure 6C:
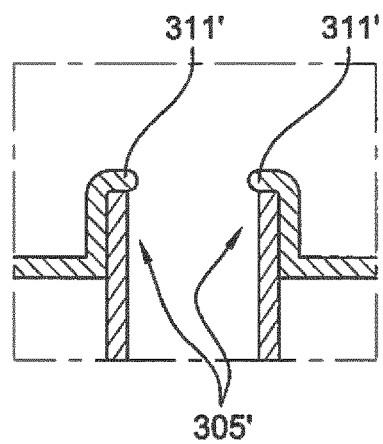

FIGS. 6A-6C illustrate another embodiment of the invention which is similar to the embodiment of FIGS. 2A-2C with this difference that the connecting member 305 is not integrally formed with the first shell 301 and in that there is provided a circumferential edge 311 adjacent the opening 306 in the second shell 302. The edge 311 may be a tubular part which extends in an upright manner from the bottom of the recessed part 304 of the second shell 303. The assembly operation is as follows. In a first step A the connecting member 303 is connected to the first shell 301 using a suitable welding technique. In a second step B the second shell 302 is placed on the first shell 301 such that an end part 305 of the connecting member 303 is arranged in the opening 306, and the first shell 301 is welded to the second shell 302 along a circumferential zone. At the same time, or subsequently, the end part 305 is connected to a wall part of the second shell 302 by pressing a heated tool 308 on an external area surrounding the opening 306. In the illustrated example the external area is mainly formed by an outer surface of the edge 311, and the wall part is formed by an inner surface of the edge 311. The tool 308 may have a specially shaped bottom for applying a suitable pressure and for shaping the part to be welded in a suitable way. In the exemplary embodiment of FIGS. 6A-C the tool 308 will press the edge 311 inwardly such that it adheres with its inner surface to the end part 305 along a circumferential zone thereof, see the deformed parts 311' and 305' of FIG. 6C. Although not illustrated, the skilled person understands that optionally a cover may be arranged over and connected along a circumference thereof, in a leak-tight way, to a wall part, and in particular a part of the edge 311.

Figure 7A:
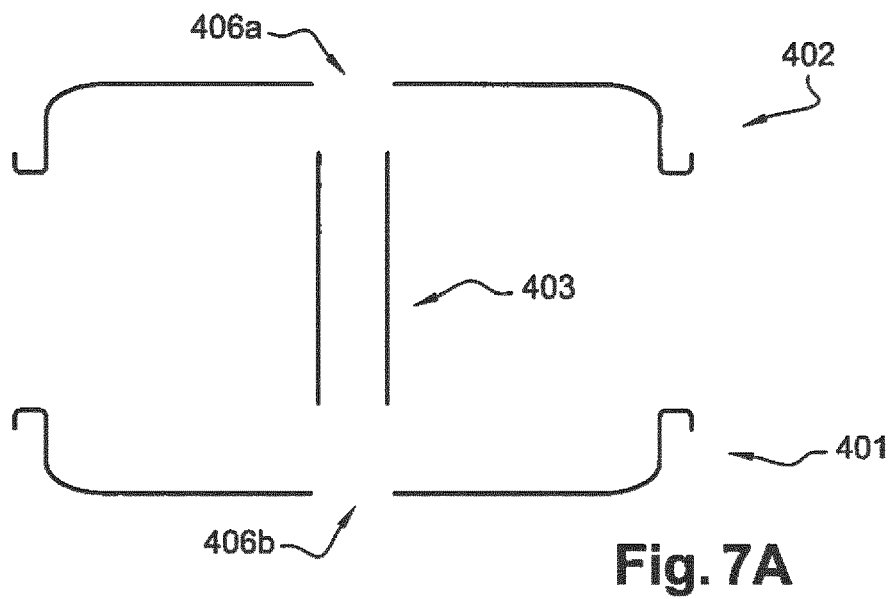
FIGS. 7A-7C illustrate schematically a fifth embodiment of the method of the invention.
Figure 7B:
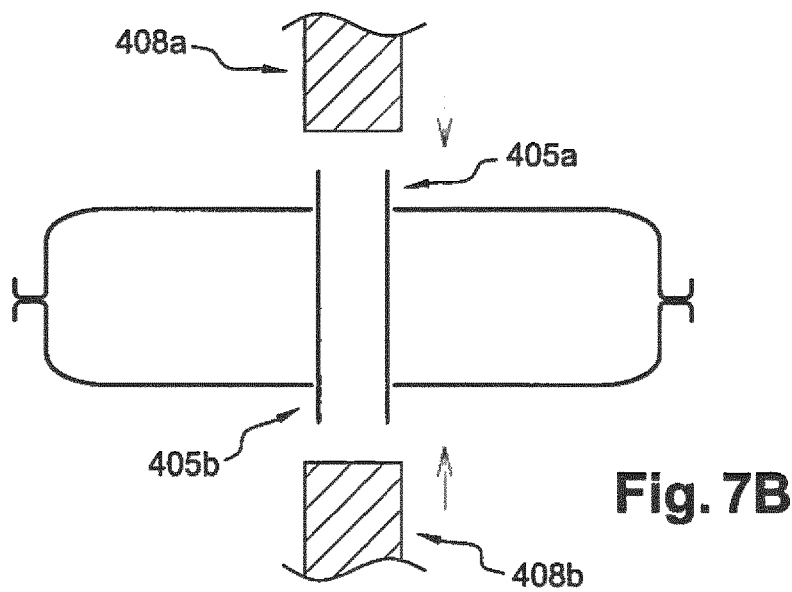
Figure 7C:
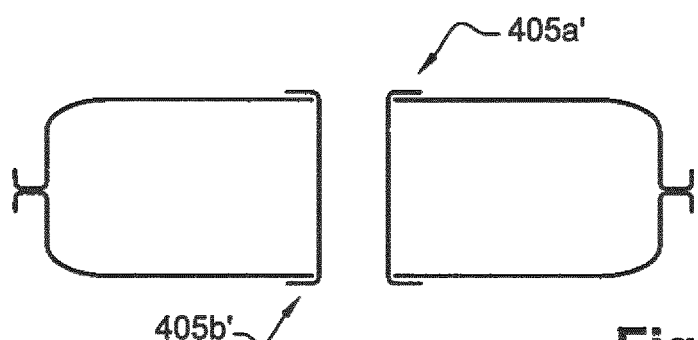

FIGS. 7A-7C illustrate another embodiment of the invention which is similar to the embodiment of FIGS. 2A-2C with this difference that the connecting member 405 is not integrally formed with the first shell 401, and that both the second shell 402 and the first shell 401 are provided with an opening 406a, 406b respectively. A connecting member 403 is arranged in the internal volume with an end part 405a thereof in the opening 406a in the second shell 402, and another end part 405b thereof in the opening 406b in the first shell 401. Both the end part 405a and the other end part 405b of the connecting member 403 are connected in a leak-tight way to a wall part of the second shell 402 and the first shell 401, respectively. The connecting of the end parts 405a, 405b may be performed simultaneously using two tools 408a, 408b. According to a variant the end part 405a and the other end part 405b may be welded in subsequent steps, optionally using the same tool 408. Although FIGS. 7A-7C illustrate a substantially flat first and second shell with openings 406a, 406b, the skilled person understands that edges and/or recessed parts could be provided as in the embodiment of FIGS. 6A-6C. Although not illustrated, the skilled person understands that also in this exemplary embodiment covers may be arranged over and connected along a circumference thereof, in a leak-tight way, to wall parts of the second/first shell 402, 401 or to the deformed end parts 405a', 405b'.

Figure 8A:
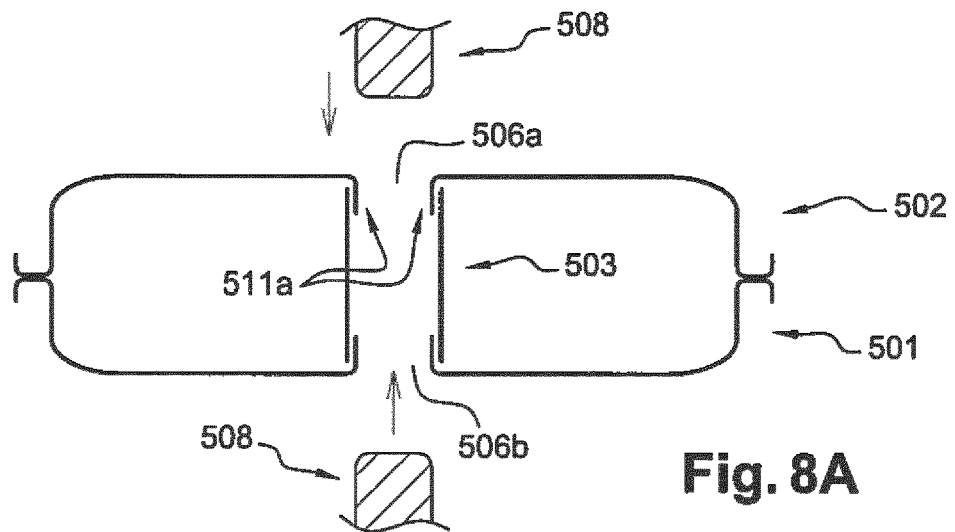
Figure 8B:
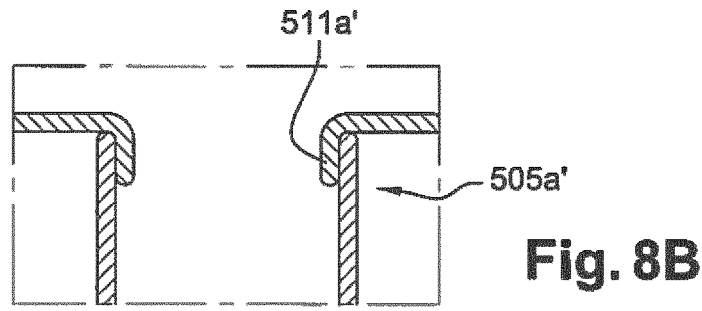

FIGS. 8A-8B illustrate an embodiment of the invention which is similar to the embodiment of FIGS. 7A-7C with this difference that the first and second shells 501, 502 are provided with edges 511a, 511b around openings 506a, 506b, respectively. The edges 511a, 511b extend inwardly (in the direction of the internal volume) instead of outwardly as in the embodiment of FIGS. 6A-6C. In a first step of the assembly the first and second shells 501 and 502 are placed on top of each other such that the tubular end parts 505a, 505b are arranged around the edges 511a, 511b, i.e. around the openings 506a, 506b, respectively. Next, a circumference of the first shell 501 is welded to a circumference of the second shell 502. At the same time, or subsequently the end parts 505a, 505b are connected to circumferential wall parts, here the internal surfaces of edges 511a, 511b, of the second and first shell 502, 501, respectively by pressing a heated tool 508 to an external area, here the external surfaces of edges 511a, 511b. In that regard it is noted that, although the edges 511a, 511b are directed inwardly, the edge surfaces contacted by the tool 508 are to be considered, within the concept of embodiments of the invention, as external surfaces, i.e. surfaces that are accessible from the outside of the tank.

Figure 9:
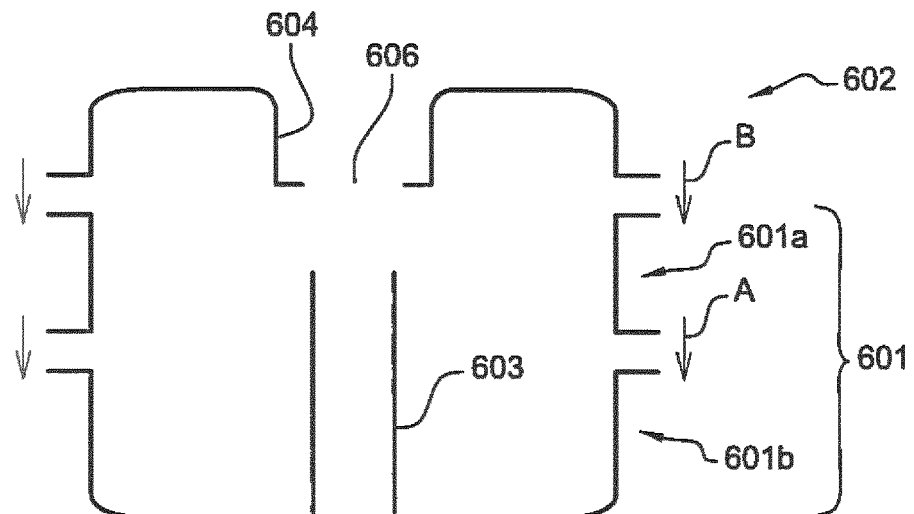
FIG. 9 illustrates a seventh embodiment of the invention.

FIG. 9 illustrates another embodiment of the invention which is similar to the embodiment of FIGS. 2A-2C with this difference that the first shell 601 is not integrally moulded but formed by welding a first parts 601a to a second part 601b in a first step A. The following steps may be similar to the steps described above in connection with FIGS. 2A-2C. This embodiment illustrates that the first shell and/or the second shell may be formed of multiple parts and do not need to be moulded integrally as a single part.

The connecting member illustrated in the figures may be shaped to function as a reinforcement member and/or may function as a tank accessory member for receiving therein and/or for supporting a tank accessory. If the connecting member is hollow, if a cover is provided, and if the interior of the connecting member communicates with the internal volume of the tanks, e.g. a level gauge, a pressure sensor, etc could be provided in the connecting member.

The first shell and/or the second shell of the embodiments illustrated in the figures may be moulded by any one of the following techniques or by a combination of those techniques: injection moulding, compression moulding, injection-compression moulding, thermoforming, blow moulding, extrusion blow moulding, co-injection moulding.

Finally it is noted that embodiments of the invention may be combined with prior art techniques for arranging a connecting member in the tank. For example, there could be arranged a first connecting member in the tank in accordance with embodiments of the invention, and a second connecting member integrally moulded with the first shell having an end part that is welded to an interior part of the second shell.

Whilst the principles of the invention have been set out above in connection with specific embodiments, it is to be understood that this description is merely made by way of example and not as a limitation of the scope of protection which is determined by the appended claims.

The invention claimed is:

1. A method for assembling a tank, comprising:
    providing a plastic first shell, a plastic second shell with an opening, and at least one connecting member, the connecting member being in a single piece, with a plastic end part configured to be arranged in or around the opening, the first and second shell delimiting an internal volume of the tank, and the connecting member being dimensioned for connecting the first and second shell in the internal volume of the tank;
    welding a circumference of the first shell to a circumference of the second shell;
    arranging the end part in or around the opening;
    once the two shells are welded together, connecting the end part of the connecting member to a wall part of the second shell by heating, from the outside of the tank, an external area of the second shell surrounding the opening and/or the end part of the connecting member,
    wherein the end part comprises a solid part, and the connecting comprises pushing the solid part outwardly onto a circumferential wall part surrounding the opening, and adhering the outwardly pushed part to the circumferential wall part.

2. A method of claim 1, wherein the connecting further comprises applying pressure on the external area surrounding the opening.

3. A method of claim 1, wherein the first shell and the connecting member are molded integrally as a single piece.

4. A method of claim 1, wherein, before the welding and the connecting, the connecting member is connected to an inner wall of the first shell.

5. A method of claim 1, wherein the first shell includes an opening, and another end part of the connecting member is arranged in the opening in the first shell;
    the method further comprising connecting the other end part of the connecting member to a wall part of the first shell by heating an external area of the first shell surrounding the opening in the first shell and/or by heating the other end part.

6. A method of claim 1, wherein the second shell is molded with a wall comprising a recessed part with a bottom containing the opening, wherein the bottom comprises a circumferential zone around the opening; and the connecting comprises welding the end part to the circumferential zone.

7. A method of claim 1, wherein the end part comprises a tubular part, and the connecting comprises heating the tubular part such that it contacts and adheres to a circumferential wall part surrounding the opening.

8. A method of claim 7, wherein the connecting comprises pressing the tubular part outwardly.

9. A method of claim 1, wherein a cover is arranged over and connected along a circumference thereof, in a leak-tight way to the end part and/or to the wall part of the second shell.

* * * * *